United States Patent
Kodama et al.

(10) Patent No.: US 7,748,950 B2
(45) Date of Patent: Jul. 6, 2010

(54) TURBOFAN ENGINE

(75) Inventors: Hidekazu Kodama, Tokyo (JP); Shinya Goto, Tokyo (JP); Ikuhisa Mizuta, Tokyo (JP); Yoshiyuki Miyamoto, Tokyo (JP); Takeshi Murooka, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 761 days.

(21) Appl. No.: 11/568,141

(22) PCT Filed: Jan. 26, 2006

(86) PCT No.: PCT/JP2006/301206

§ 371 (c)(1),
(2), (4) Date: Oct. 20, 2006

(87) PCT Pub. No.: WO2006/080386

PCT Pub. Date: Aug. 3, 2006

(65) Prior Publication Data

US 2009/0016870 A1   Jan. 15, 2009

(30) Foreign Application Priority Data

Jan. 26, 2005   (WO) .................. PCT/JP2005/000988

(51) Int. Cl.
*F04D 17/06*   (2006.01)
(52) U.S. Cl. .................. 415/72; 415/143; 416/176; 416/198 A; 416/245 R
(58) Field of Classification Search .............. 60/226.1; 415/72, 143; 416/176, 198 A, 198 R, 203, 416/245 R
See application file for complete search history.

(56) References Cited

U.S. PATENT DOCUMENTS

| | | | |
|---|---|---|---|
| 1,779,186 A | | 10/1930 | Pavlecka |
| 2,398,203 A | * | 4/1946 | Browne ..................... 416/188 |
| 2,936,948 A | * | 5/1960 | Eck ......................... 415/218.1 |
| 3,075,743 A | | 1/1963 | Sheets |
| 3,734,649 A | | 5/1973 | Sandy |

(Continued)

FOREIGN PATENT DOCUMENTS

JP   48-2660   1/1973

(Continued)

OTHER PUBLICATIONS

International Search Report issued in corresponding case No. PCT/JP2006/301206 completed Apr. 14, 2006 and mailed Apr. 25, 2006.

(Continued)

*Primary Examiner*—Edward Look
*Assistant Examiner*—Ryan H Ellis
(74) *Attorney, Agent, or Firm*—Griffin & Szipl, P.C.

(57) ABSTRACT

A turbofan engine of the invention is provided with a fan first-stage moving blade for taking an air therein, and a spinner rotationally driving the fan first-stage moving blade, the spinner has a spiral blade extending spirally to an outer side in a radial direction, sucking the air from a front face of the spinner and supplying the air to the fan first-stage moving blade. Further, the fan first-stage moving blade and the spinner are integrally coupled, and the spiral blade and the fan first-stage moving blade are formed such that blade surfaces are smoothly connected.

3 Claims, 12 Drawing Sheets

U.S. PATENT DOCUMENTS

| | | | |
|---|---|---|---|
| 3,794,444 A * | 2/1974 | Campbell et al. | 416/201 R |
| 4,183,719 A * | 1/1980 | Bozung | 416/183 |
| 4,257,743 A | 3/1981 | Fujii | |
| 5,403,165 A | 4/1995 | Lehe et al. | |
| 6,145,300 A | 11/2000 | Romani | |
| 6,398,499 B1 | 6/2002 | Simonetti et al. | |
| 6,722,847 B2 * | 4/2004 | Freeman et al. | 415/199.4 |
| 6,935,840 B2 * | 8/2005 | Romani et al. | 416/95 |
| 2002/0194834 A1 * | 12/2002 | Springer | 60/226.1 |
| 2006/0059887 A1 | 3/2006 | Klingels et al. | |

FOREIGN PATENT DOCUMENTS

| | | |
|---|---|---|
| JP | 4-1637 | 1/1992 |
| JP | 05-180194 | 7/1993 |
| JP | 8-189419 | 7/1996 |
| JP | 11-22486 | 1/1999 |
| JP | 2001-271792 | 10/2001 |
| JP | 2004-27854 | 1/2004 |
| JP | 2004-137950 | 5/2004 |
| JP | 2005-315138 | 11/2005 |

OTHER PUBLICATIONS

Office Action issued in co-pending related U.S. Appl. No. 11/427,107, mailed Jun. 24, 2009.

Notice of Allowance issued in co-pending U.S. Appl. No. 11/427,107, dated Nov. 16, 2009.

* cited by examiner

TURBOFAN ENGINE

BACKGROUND OF THE INVENTION

1. Technical Field of the Invention

The present invention relates to a turbofan engine which has a high bypass ratio and can achieve a favorable mileage and a low noise.

2. Description of Related Art

FIG. 1 is a schematic block diagram of an aircraft engine 51 (a turbojet engine). As shown in this drawing, the turbojet engine is provided with a fan 52 taking an air therein, a compressor 53 compressing the intake air, a combustor 54 burning a fuel by the compressed air, a turbine 55 driving the fan 52 and the compressor 53 by a combustion gas of the combustor 54, an after burner 56 afterburning for increasing a thrust and the like.

The after burner 56 comprises a flame holder 57 having a triangular cross section or the like and forming a circulating region in a downstream side so as to hold the flame, a fuel nozzle 58 for jetting the fuel, a spark plug 59 and the like, and is structured such as to jet from an exhaust nozzle 62 through an inner side of a liner 61 inside an after duct 60, thereby increasing the thrust.

The turbojet engine in which the fan 52 taking the air therein is enlarged in size and a bypass ratio is enlarged is called as "turbofan engine". The bypass ratio corresponds to a flow rate ratio (bypass flow/core flow) between an air flow (a core flow) flowing into a core engine (the compressor 53, the combustor 54 and the turbine 55 mentioned above) and a bypass flow bypassing them. There is obtained an effect of reducing a flow speed of an exhaust jet and lowering a noise and a specific fuel consumption, in accordance with an increase of the ratio. In this case, a prior art relating to the jet engine is disclosed, for example, in the following patent documents 1 and 2 corresponding to Japanese Unexamined Patent Publications.

[Patent Document 1]
Japanese Unexamined Patent Publication No. 8-189419

[Patent Document 2]
Japanese Unexamined Patent Publication No. 11-22486

However, in the turbofan engine mentioned above, there is a problem that a fan first-stage moving blade (an up-front fan) and an inner diameter of a casing surrounding the fan first-stage moving blade are enlarged by enlarging the bypass ratio, and a weight of the engine is increased.

In other words, since a fan first-stage moving blade 52a structured such as to be embedded into a spinner 63 of the turbofan engine has an embedded structure, a certain degree of hub/chip ratio (inlet hub diameter/inlet chip diameter) is necessary, and an area of the fan inlet is narrowed at a degree of an area of the spinner.

Therefore, if it is intended to increase the bypass ratio for achieving the favorable mileage and the low noise, it is necessary to further widen the diameter of the fan and the inner diameter of the casing, so that the weight of the engine is increased.

SUMMARY OF THE INVENTION

The present invention is made by solving the problem mentioned above. In other words, an object of the present invention is to provide a turbofan engine which can increase an intake air flow rate of a fan first-stage moving blade without enlarging a diameter of a fan and an inner diameter of a casing, whereby it is possible to increase a bypass ratio, achieve a favorable mileage and a low noise, and reduce a weight of an engine.

In order to achieve the object of the present invention, in accordance with a first aspect of the present invention, there is provided a turbofan engine comprising:

a fan first-stage moving blade for taking an air therein; and
a spinner rotationally driving the fan first-stage moving blade,
wherein the spinner has a spiral blade extending spirally to an outer side in a radial direction, sucking the air from a front face of the spinner and supplying the air to the fan first-stage moving blade.

A second aspect of the present invention corresponds to a preferable mode of the first aspect, and is structured such that the fan first-stage moving blade and the spinner are integrally coupled, and the spiral blade and the fan first-stage moving blade are formed such that blade surfaces are smoothly connected.

A third aspect of the present invention corresponds to a preferable mode of the first aspect, and is structured such that the spiral blade extends to an outer side in the radial direction from an axis thereof.

In accordance with the first to third aspects of the present invention, since the spinner has the spiral blade extending spirally to the outer side in the radial direction from the axis thereof, sucking the air from the front face of the spinner and supplying the air to the fan first-stage moving blade, it is possible to suck the air from the front face of the spinner so as to compress the air and supply the air to the fan first-stage moving blade. Accordingly, since a total area in the front side of the engine forms an air inflow area of the fan first-stage moving blade as it is, it is possible to make the diameter of the fan small, whereby it is possible to reduce the weight of the engine.

A fourth aspect of the present invention corresponds to a preferable mode of the first aspect, and is structured such that a leading end of the spiral blade is positioned in a downstream side rather than a leading end of the spinner.

In accordance with the fourth aspect of the present invention, since a pitch between the blades of the leading end of the spiral blade is widened, it is hard to form an ice. Further, since the spiral blade itself is downsized and the weight is reduced, it is possible to reduce the weight of the engine.

A fifth aspect of the present invention corresponds to a preferable mode of the first aspect, and is structured such that the spiral blade and the fan first-stage moving blade are separated.

In accordance with the fifth aspect of the present invention, since the spiral blade and the fan first-stage blade are separated, it is easy to manufacture the fan.

A sixth aspect of the present invention corresponds to a preferable mode of the fifth aspect, and is structured such that a separated region at the radial direction formed between a rear edge end of the spiral blade and a front edge end of the fan first-stage moving blade arranged at the nearest position of the rear edge end of the spiral blade is formed in such a manner as to extend in a direction inclined to a front side of the engine toward the outer side in the radial direction with respect to a plane perpendicular to a center line of the engine.

In accordance with the sixth aspect of the present invention, since the separated region is formed in such a manner as to extend in the direction inclined to the front side of the engine toward the outer side in the radial direction with respect to the plane perpendicular to the center line of the engine, a chord length in a tip side of the spiral blade becomes shorter in comparison with a case that the separated region is formed in a perpendicular direction to the center line of the engine, whereby a work load with respect to a flow in the tip side is reduced. Therefore, in accordance with the sixth aspect of the present invention, a pressure gradient becomes gentle at the position brought into contact with the external flow in the tip side in comparison with the case that the separated region is formed in the perpendicular direction to the center line of the engine, and a generation of vortex can be widely suppressed. Accordingly, even if the spiral blade and the fan first-stage moving blade are separated, an aerodynamic performance of the fan is not lowered.

A seventh aspect of the present invention corresponds to a preferable mode of the fifth aspect, and is structured such that a separated region at the radial direction formed between a rear edge end of the spiral blade and a front edge end of the fan first-stage moving blade arranged at the nearest position of the rear edge end of the spiral blade is formed in such a manner as to extend in a direction of 90 degree or close thereto with respect to a hub side passage surface.

In accordance with the seventh aspect of the present invention, the pressure gradient in the separated region is reduced, and a roll-up of the vortex in this portion is suppressed, whereby the vortex generated by the spiral blade is reduced. Therefore, even if the spiral blade and the fan first-stage moving blade are separated, the aerodynamic performance of the fan is not lowered.

An eighth aspect of the present invention corresponds to a preferable mode of the seventh aspect, and is structured such that the separated region is formed in such a manner as to extend in a direction inclined to the front side of the engine rather than 90 degree with respect to the hub side passage surface.

In accordance with the eighth aspect of the present invention, since an effect that the pressure gradient at the position brought into contact with the external flow in the tip side of the spiral blade becomes gentle is added to the effect that the pressure gradient in the separated region becomes gentle, the effect of suppressing the generation of vortex is further increased.

A ninth aspect of the present invention corresponds to a preferable mode of the fifth to eighth aspects, and is structured such that a meridian plane shape at a position in a radially outer side rather than a root of the separated region in the spiral blade corresponds to a shape in which a chord length is reduced toward the tip side from the hub side, and the chord length comes to zero without limit in the tip, the tip is formed at a position brought into contact with a diametrically outer end of the separated region in the spiral blade, a portion protruding to the spiral blade side is formed at a position brought into contact with the diametrical outer end of the separated region in the front edge of the fan first-stage moving blade, and the tip in the spiral blade and the protruding portion in the fan first-stage moving blade are formed in a curved shape.

In accordance with the ninth aspect of the present invention, since it is possible to suppress the generation of vortex in the tip side of the spiral blade, and the protruding portion of the fan first-stage moving blade, the aerodynamic performance of the fan is not lowered even if the spiral blade and the fan first-stage moving blade are separated.

A tenth aspect of the present invention corresponds to a preferable mode of the fifth to eighth aspects, and is structured such that the spiral blade is arranged in a back side of the fan first-stage moving blade in such a manner that a phase is shifted in a peripheral direction.

In accordance with the tenth aspect of the present invention, it is possible to expect an effect of blowing away a boundary layer in a back side of the fan first-stage moving blade by arranging the spiral blade in the back side of the fan first-stage moving blade in such a manner as to shift the phase in the peripheral direction, and it is possible to reduce a pressure loss so as to improve an engine performance.

An eleventh aspect of the present invention corresponds to a preferable mode of the fifth to eighth aspects, and is structured such that the number of the spiral blade is a half of the number of the fan first-stage moving blade.

A twelfth aspect of the present invention corresponds to a preferable mode of the eleventh aspect, and is structured such that the spiral blade is arranged alternately one by one with respect to the fan first-stage moving blade.

In accordance with the eleventh and twelfth aspects of the present invention, since the number of the spiral blade comes to a half, the total weight of the spiral blade is reduced by half, it is possible to achieve a weight saving of the engine, and it is possible to reduce a cost.

A thirteenth aspect of the present invention corresponds to a preferable mode of the fifth to eighth aspects, and is structured such that a shape and an arrangement of the spiral blade and the fan first-stage moving blade are set such that a wake in the hub side of the spiral blade is brought into contact with the back face of the fan first-stage moving blade, and a wake in the tip side of the spiral blade is brought into contact with a body side of the fan first-stage moving blade.

In accordance with the thirteenth aspect of the present invention, the vortex generated in the tip side of the spiral blade is inhibited from being widened by the fan first-stage moving blade forming the wall, as well as a peeling of the flow is reduced in the rear edge of the fan first-stage moving blade by suppressing a development of a boundary layer in the back side of the fan first-stage moving blade on the basis of the wake in the hub side of the spiral blade. Accordingly, since it is possible to widely reduce the pressure loss caused by the peeling and the expansion of the vortex, it is possible to contribute to a high efficiency of the engine.

DESCRIPTION OF THE PREFERRED EMBODIMENT

Figure 1:
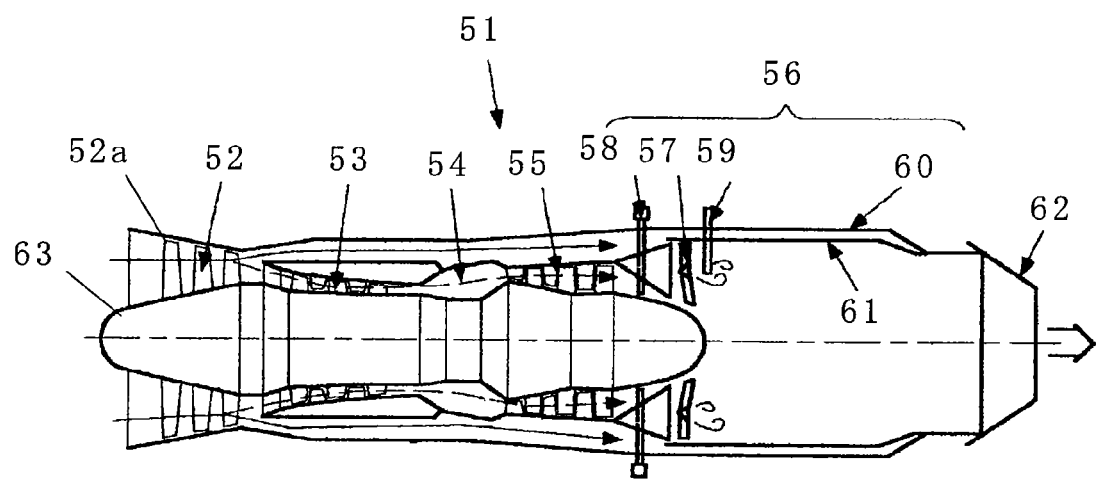
FIG. 1 is a structural drawing of a conventional turbofan engine.

A description will be given below of preferable embodiments in accordance with the present invention with reference to the accompanying drawings. In this case, in each of the drawings, the same reference numerals are attached to the common portions, and an overlapping description will be omitted.

Figure 2A:
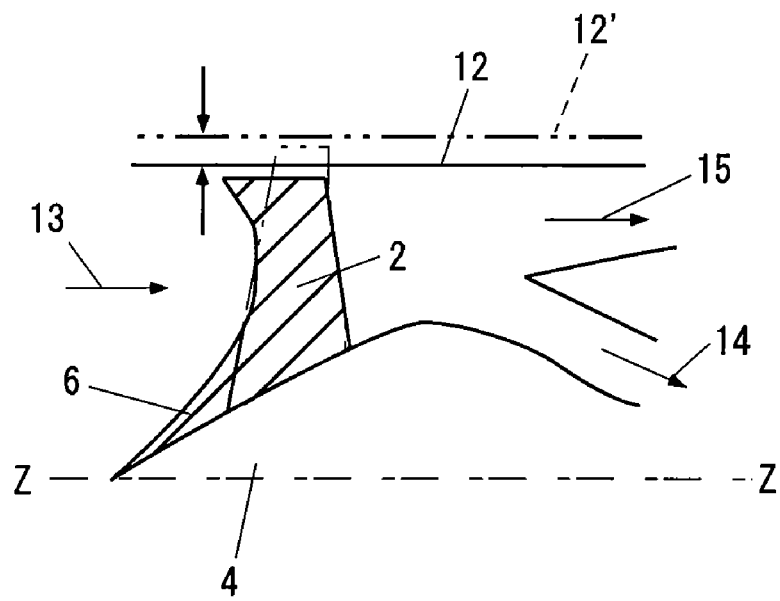
FIG. 2A is a partially structural drawing of a turbofan engine in accordance with a first embodiment of the present invention.
Figure 2B:
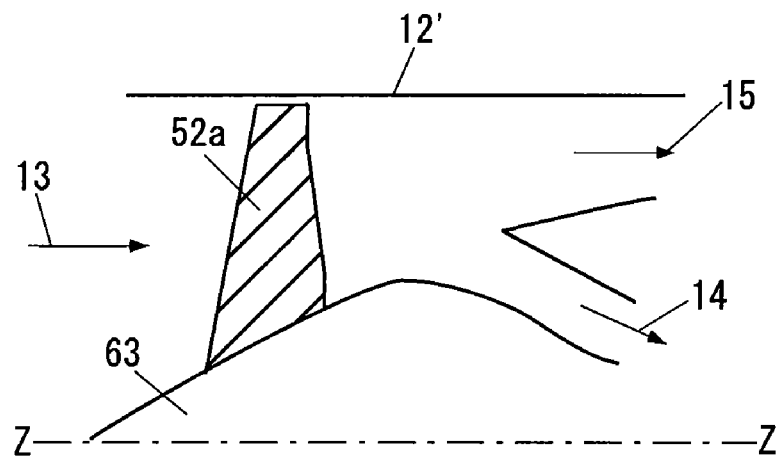
FIG. 2B is a partially structural drawing of the conventional turbofan engine.

FIG. 2A is a partially structural drawing of a turbofan engine in accordance with a first embodiment of the present invention. Further, FIG. 2B shows a conventional embodiment. In each of the drawings, reference symbol Z-Z denotes a center line of an engine, reference numerals 12 and 12' denote an inner diameter of a casing, reference numeral 13 denotes a flow of an inflow air, reference numeral 14 denotes a core flow and reference numeral 15 denotes a bypass flow.

As shown in FIG. 2A, the turbofan engine in accordance with the present invention is provided with a fan first-stage moving blade 2 for taking an air therein, and a spinner 4 rotationally driving the fan first-stage moving blade 2. Further, the spinner 4 has a spiral blade 6 in a front face thereof. The spiral blade 6 extends spirally to an outer side in a radial direction from an axis Z of the spinner 4, sucks the air from the front face of the spinner, and compresses the air so as to supply to the fan first-stage moving blade 2.

A shape of the spiral blade 6 is preferably formed as a helical blade which is similar to an impeller shape, for example, of a mixed flow compressor or a radial flow compressor.

Further, the fan first-stage moving blade 2 and the spinner 4 are preferably coupled integrally, and the spiral blade 6 and the fan first-stage moving blade 2 are formed in such a manner that respective blade surfaces are smoothly connected.

An analysis for checking out a performance of the present invention is executed by using the prior art and the present invention shown in FIGS. 2B and 2A. In comparison with the conventional type shown in FIG. 2B, in accordance with the present invention, the moving blades (the spiral blade 6 and the fan first-stage moving blade 2) are provided from the center line Z of the engine, and an outer diameter (12, 12') of the engine is set smaller about 5% in the present invention 12 in comparison with the conventional type 12'. Further, the analysis in this case is executed under a condition that an entire pressure distribution and an entire temperature distribution are uniform in the rear side of the fan first-stage moving blades 2 and 52a.

Figure 3A:
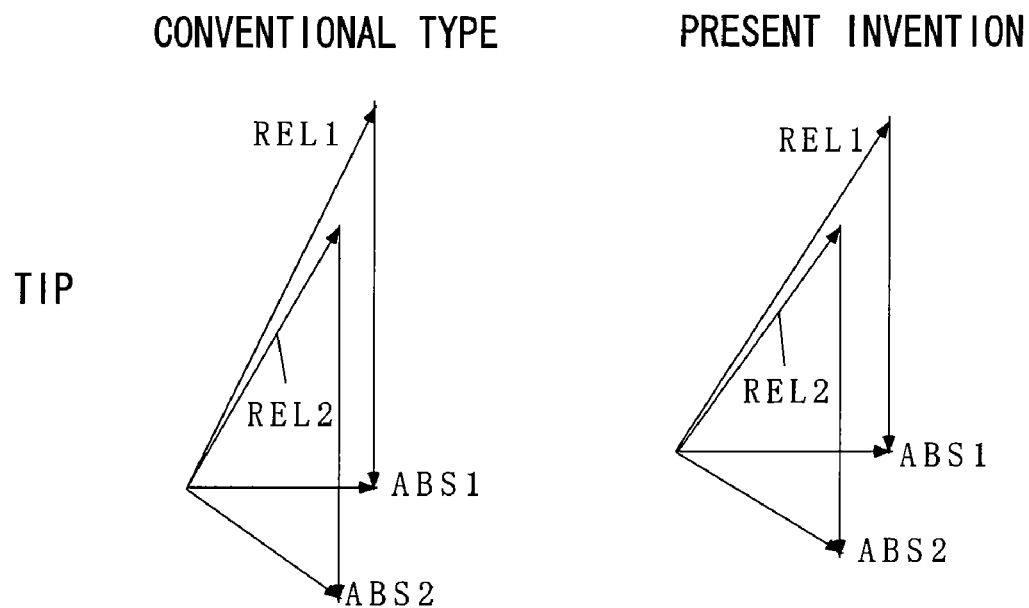
FIG. 3A is explanatory view of the turbofan engine in accordance with the present invention.
Figure 3B:
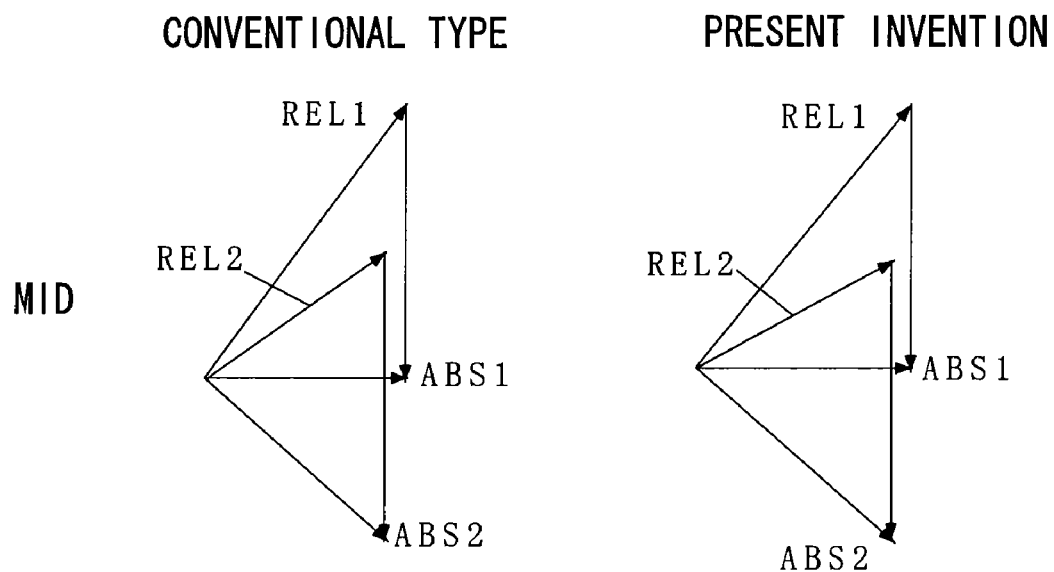
FIG. 3B is explanatory view of the turbofan engine in accordance with the present invention.
Figure 3C:
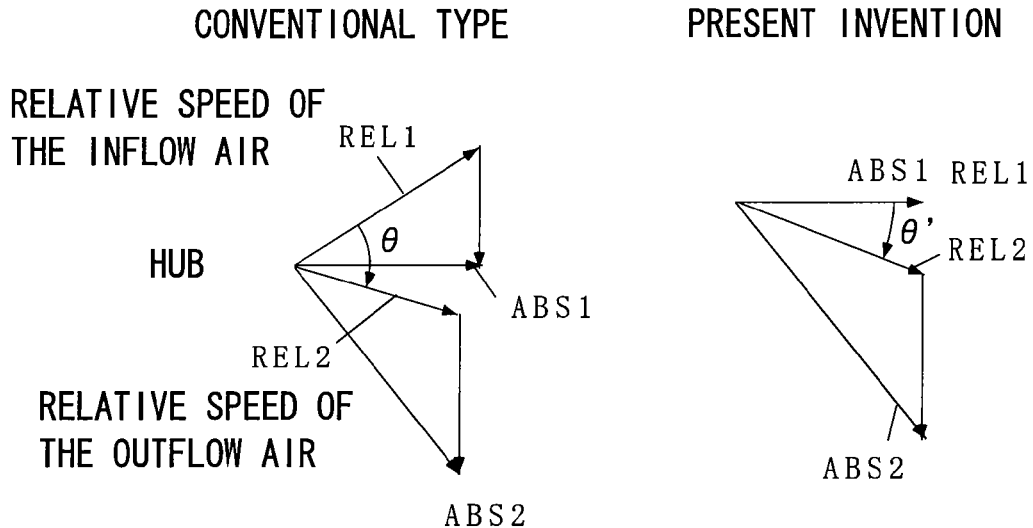
FIG. 3C is explanatory view of the turbofan engine in accordance with the present invention.

FIGS. 3A to 3C show a speed triangle of the fan first-stage moving blade on the basis of the result of analysis by three cross sections (hub, mid and tip). Reference symbols ABS1 and ABS2 in the drawings denote absolute speeds of an inflow air and an outflow air, and reference symbols REL1 and REL2 denote relative speeds of the inflow air and the outflow air.

As is understood from FIGS. 3A to 3C, it can be said that the speed triangles in the mid and the tip are approximately equal in the conventional type and the present invention. However, a difference appears in the speed triangle in the hub, and turning angles θ and θ' (a difference between the relative flow angles in an inlet and an outlet) turning the flow are apparently smaller in the present invention. In other words, the turning angle θ' in the conventional embodiment is about 50 degree, however, the turning angle θ in the present invention is only about 20 degree.

Accordingly, in the present invention, a load applied to the blade is lighter than the conventional type, and it is known that it is easy to achieve the blade mentioned above. Further, if it is possible to increase the work of the spinner portion and it is possible to increase the flow rate by increasing the axial speed of the flow flowing into the spinner portion, it is possible to make the outer diameter of the engine further smaller.

In accordance with the structure of the first embodiment of the present invention mentioned above, since the spinner 4 has the spiral blade 6 extending spirally to the outer side in the radial direction from the axis Z, sucking the air from the front face of the spinner and supplying the air to the fan first-stage moving blade 2, it is possible to suck the air from the front face of the spinner, compress the air and supply the air to the fan first-stage moving blade 2.

Accordingly, since a total area in the front side of the engine comes to the air inflow area of the fan first-stage moving blade 2 as it is, it is possible to increase the intake air flow rate of the fan first-stage moving blade even if the diameter of the fan and the inner diameter of the casing are made smaller than the conventional type. Accordingly, it is possible to increase the bypass ratio, and it is possible to reduce the weight of the engine as well as achieving the favorable mileage and the low noise.

Figure 4:
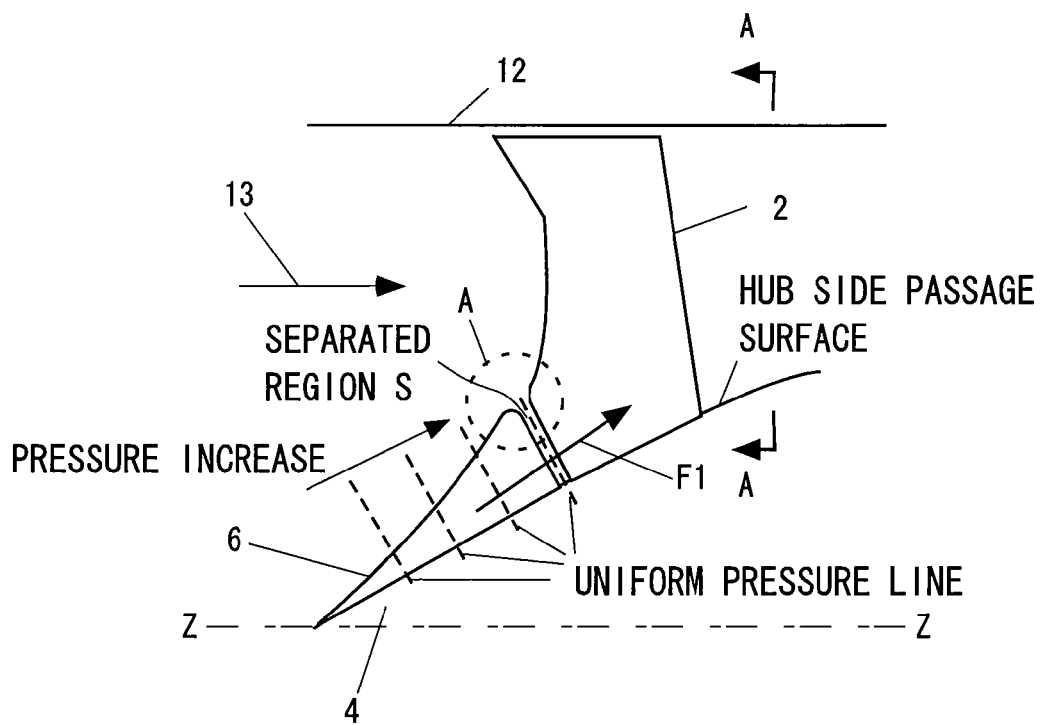
FIG. 4 is a partially structural drawing of a turbofan engine in accordance with a second embodiment of the present invention.

FIG. 4 is a partially structural drawing of a turbofan engine in accordance with a second embodiment of the present invention. As shown in this drawing, in accordance with the present embodiment, the spiral blade 6 is separated from the fan first-stage moving blade 2, and the same number of spiral blades as the fan first-stage moving blades 2 are arranged in an upstream side of the fan first-stage moving blade 2.

A strain is generated in a radial direction of the spiral blade 6 and the fan first-stage moving blade 2 due to a centrifugal force of a rotational motion, however, the strains are different between the both due to the difference of the both. Accordingly, in the case that the spiral blade 6 and the fan first-stage moving blade 2 are coupled such as the first embodiment 1, there can be considered that a harmful stress is generated due to the difference of the strains. Further, there can be considered that it is hard to couple the spiral blade 6 and the fan first-stage moving blade 2 due to a manufacturing error in each of the members or the like. However, in accordance with the second embodiment of the present invention, since the spiral blade 6 and the fan first-stage moving blade 2 are separated, these problems are not generated, and there can be obtained an effect that the fan can be easily manufactured.

Further, as shown in FIG. 4, in the rear edge of the spiral blade 6, and the front edge of the fan first-stage moving blade 2, the portion corresponding to the rear edge of the spiral blade 6 extends in a direction inclined to the front side of the engine toward a radially outer side with respect to a plane perpendicular to the center line Z of the engine, and forms a separated region S therebetween. Accordingly, in the second embodiment, the separated region S at the radial position formed between the rear edge end of the spiral blade 6 and the front edge end of the fan first-stage moving blade 2 arranged at the nearest position of the rear edge end of the spiral blade 6 is formed in such a manner as to extend in the direction inclined to the front side of the engine toward the radially outer side with respect to the plane perpendicular to the center line Z of the engine.

Figure 5:
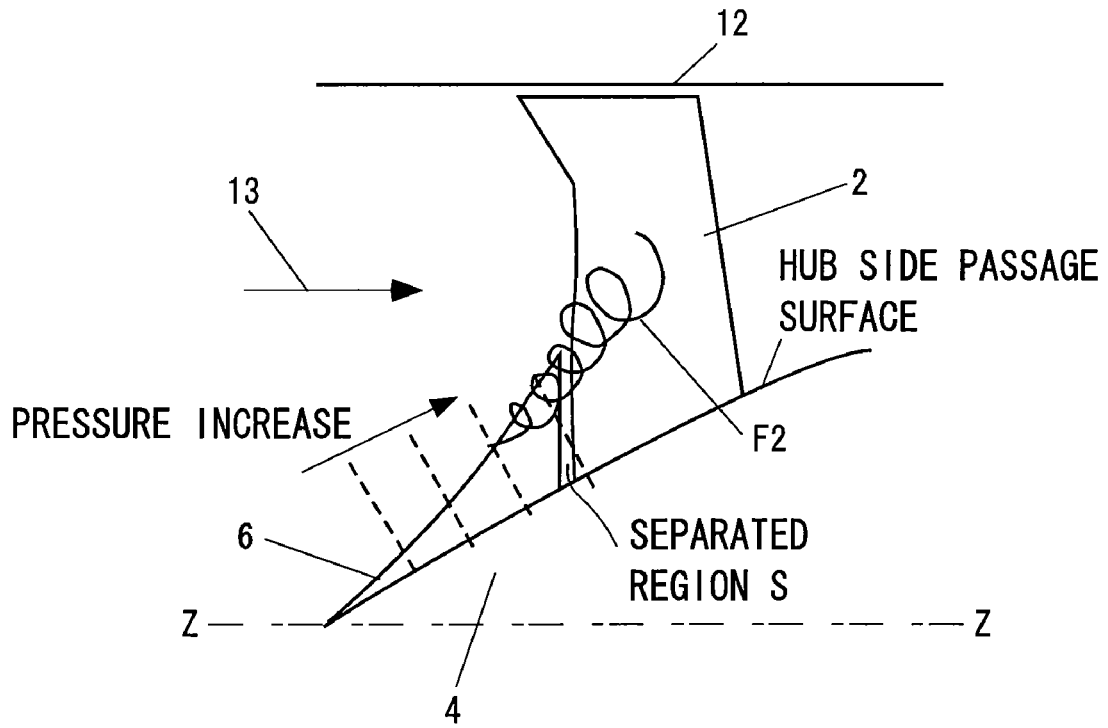
FIG. 5 is a partially structural drawing of the turbofan engine in the case that a separated region is set to a perpendicular direction to an axial center line.

FIG. 5 shows a case that the separated region S extends in a perpendicular direction to an axial center line Z (this is called as "perpendicular separation" conveniently). In the case of the perpendicular separation mentioned above, a chord length becomes longer in a tip side of the spiral blade and a work load with respect to the flow becomes too much, whereby a pressure gradient becomes larger at a portion where an external flow executing no work and the tip side of the spiral blade 6 are brought into contact with each other. Therefore, a vortex tends to be generated in the tip side of the spiral blade 6. In this case, "chord length" mentioned above means a length of a chord of blade in a longitudinal direction of the engine (a direction in parallel to the center line Z of the engine).

On the contrary, in accordance with the present invention, the separated region S is formed in such a manner as to extend in the direction inclined to the front side of the engine toward the radially external side with respect to the perpendicular plane of the center line Z of the engine, as shown in FIG. 4.

In the case that an entire blade shape obtained by combining the spiral blade 6 and the fan first-stage moving blade 2 in FIG. 4 is identical to the shape shown in FIG. 5, and front and rear positions of a root (a radially inner end portion) of the separated region S shown in FIG. 4 are identical to the positions shown in FIG. 5, the chord length in the tip side of the spiral blade 6 is shorter in the embodiment in FIG. 4 in comparison with the perpendicularly separated case as shown in FIG. 5, whereby the work load with respect to the flow in the tip side is reduced. Accordingly, in comparison with the perpendicular separation, the pressure gradient becomes gentle at a position brought into contact with the external flow in the tip side, and a generation of vortex is widely suppressed. Therefore, even if the spiral blade 6 and the fan first-stage moving blade 2 are separated, an aerodynamic performance of the fan is not lowered.

Further, it is preferable to set an angle of gradient of the separated region S in a range shown below. In other words, as shown in FIG. 4, it is preferable that the separated region S is formed so as to extend in a direction of 90 degree or a close angle (about 10 degree larger and smaller than 90 degree) with respect to the hub side passage surface. A flow line direction around the separated region S becomes in parallel to the hub side passage surface, and a uniform pressure line is distributed in a perpendicular direction to the flow line direction. In other words, it is preferable that the separated region S extends in a direction along the uniform pressure line.

In the case of the perpendicular separation shown in FIG. 5, since the separated region S extends in the direction orthogonal to the uniform pressure line, a high pressure region and a low pressure region exist in an outer side and an inner side in a diametrical direction of the separated region S, and the pressure gradient is large. Accordingly, a component of velocity in a diametrically outside direction is generated in the separated region S, and the vortex rolls up outward in a radial direction as shown by a flow F2 in this drawing. However, in accordance with the second embodiment of the present invention, since the separated region S formed between the spiral blade 6 and the fan first-stage moving blade 2 extends in the direction of 90 degree (the direction along the uniform pressure line) or the close angle thereof with respect to the hub side passage surface, the pressure gradient is reduced in the separated region S, and the roll-up of the vortex is suppressed as shown by the flow F1 in FIG. 4, whereby the vortex generated by the spiral blade 6 is reduced. Therefore, even if the spiral blade 6 and the fan first-stage moving blade 2 are separated, the aerodynamic performance of the fan is not lowered.

As mentioned above, if the separated region S is formed in such a manner as to extend in the direction of 90 degree or the close angle thereof with respect to the hub side passage surface, an effect of suppressing the generation of vortex is increased, on the basis of a combination between the effect of making the pressure gradient at the position brought into contact with the external flow in the tip side of the spiral blade 6 gentle mentioned above, and the effect of making the pressure gradient in the separated region S gentle.

Further, taking into consideration the effect of making the pressure gradient at the position brought into contact with the external flow in the tip side of the spiral blade 6 gentle mentioned above, it is preferable that the separated region S is formed in such a manner as to extend in a direction inclined to the front side of the engine rather than 90 degree with respect to the hub side passage surface. Since the separated region S is formed as mentioned above, it is possible to effectively suppress the generation of vortex by making the chord length in the tip side of the spiral blade 6 as short as possible while keeping the angle of gradient of the separated region S in an angular range having a small pressure gradient.

Further, as shown in FIG. 4, a meridian plane shape at a position in a radially outer side from a root (a radially inner end portion) of the separated region S in the spiral blade 6 is formed in such a shape that the chord length is reduced toward the tip side from the hub side, and the chord length comes close to zero without limit. The tip is formed at a position brought into contact with the diametrically outer end of the separated region S in the spiral blade 6. A protruding portion to the spiral blade 6 side is formed at a position brought into contact with the diametrically outer end of the separated region S in the front edge of the fan first-stage moving blade 2.

Figure 6:
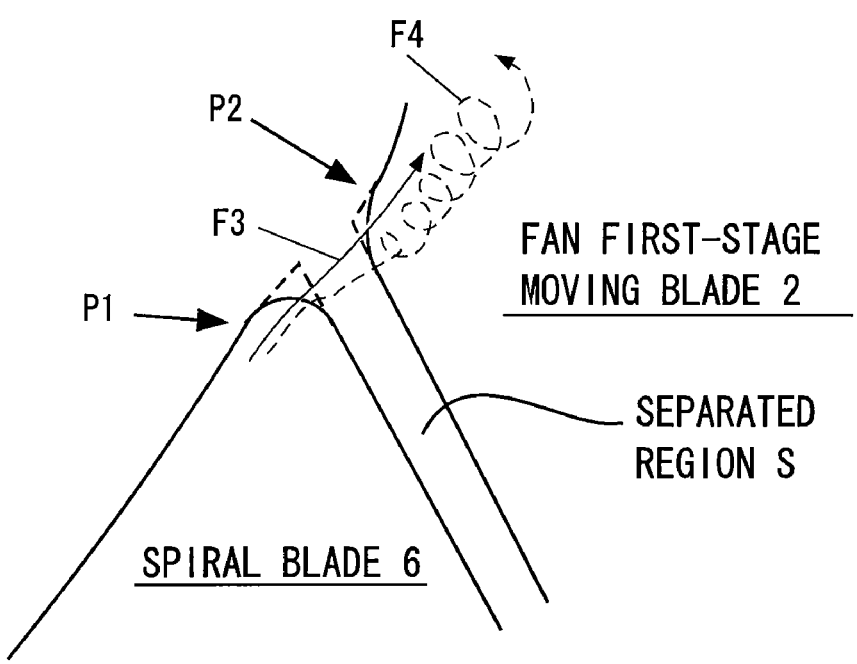
FIG. 6 is an enlarged view of a portion A in FIG. 4.

FIG. 6 is an enlarged view of a portion A in FIG. 4. As shown in FIG. 6, the tip P1 in the spiral blade 6 and the protruding portion P2 in the fan first-stage moving blade 2 form a curved shape. The curved shape is not limited to a circular arc surface and an oval surface, but may be constituted by a curved surface defined by the other quadratic curves. Further, a case that the portions P1 and P2 are not formed in the curved shape, but is formed in an acute shape is shown by a imaginary line. In the case that the tip P1 of the spiral blade 6 and the protruding portion P2 in the fan first-stage moving blade 2 are formed in the acute shape as shown by the imaginary line, the vortex is generated as shown by a flow F4. Because the work is executed with respect to the flow in the portion and the vortex tends to be generated in the case that the portion P1 is formed in the acute shape, and the vortex tends to be generated at time when the flow comes into collision with the portion in the case that the portion P2 is formed in the acute shape.

On the contrary, in the second embodiment in accordance with the present invention, since the tip P1 of the spiral blade 6 is formed in the curves shape, and the work is not executed with respect to the flow at the degree at which the blade corresponding to the acute shape shown by the imaginary line is not provided, the vortex is hard to be generated. Further, since the protruding portion P2 in the fan first-stage moving blade 2 is formed in the curved shape, and the blade portion having the acute shape shown by the imaginary line is not provided, the turbulence of the flow is hard to be generated. Therefore, in accordance with the second embodiment of the present invention, it is possible to suppress the generation of vortex in the tip P1 of the spiral blade 6 and the protruding portion P2 of the fan first-stage moving blade 2 such as the flow F3 shown in FIG. 6.

Figure 7:
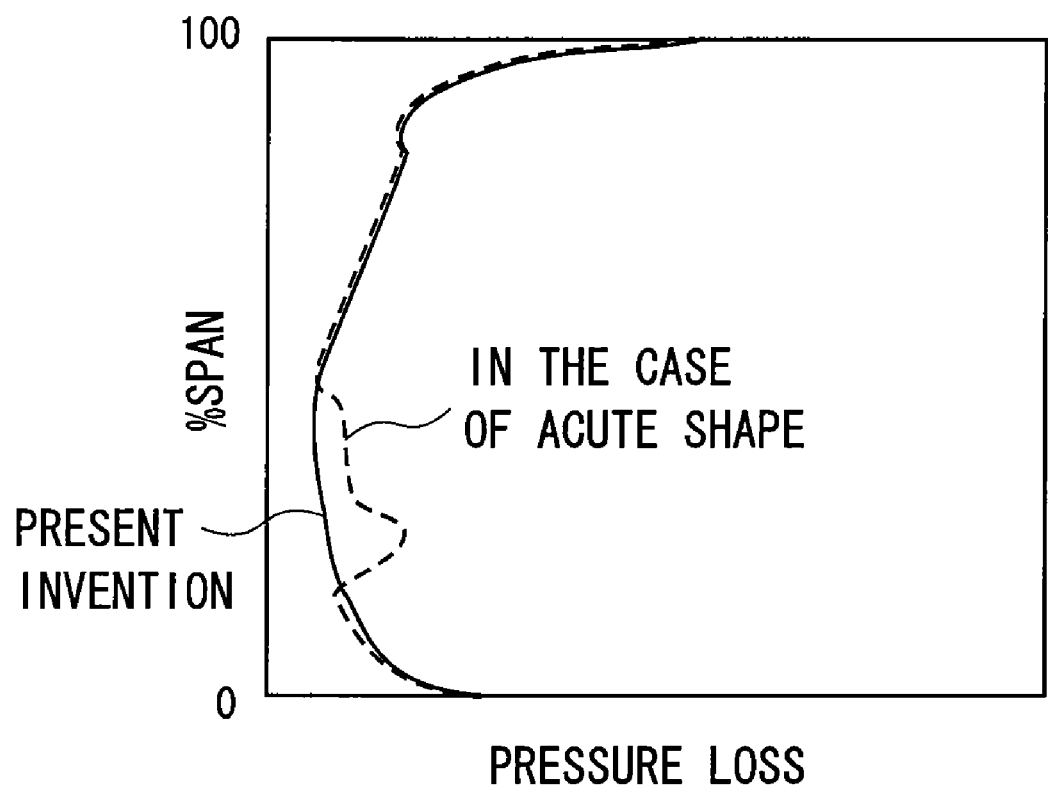
FIG. 7 is a drawing showing a result of numerical analysis about a pressure loss in a cross section along a line A-A in FIG. 4.

FIG. 7 is a view showing a result of numerical analysis about the pressure loss in the cross section along the line A-A in FIG. 4. In FIG. 7, a vertical axis indicates a position in the flow path at a time of setting the hub side passage surface to 0% and setting the engine outer diameter 12 to 100%, and a horizontal axis indicates a pressure loss. From FIG. 7, in accordance with the present invention, it is known that the pressure loss can be widely lowered in comparison with the case that the portions P1 and P2 are formed in the acute shape. Therefore, in accordance with the second embodiment of the present invention, even if the spiral blade 6 and the fan first-stage moving blade 2 are separated, it is impossible to lower the aerodynamic performance of the fan.

In this case, in the second embodiment, the spiral blade 6 and the fan first-stage moving blade 2 are separated in the axial direction and the separated region S is formed therebetween, however, the present invention is not limited to this, but may be structured such that the separated region S is formed between the rear edge end of the spiral blade 6 and the front edge end of the fan first-stage moving blade 2, by shifting phases of the rear edge end of the spiral blade 6 and the front edge end of the fan first-stage moving blade 2. Further, in the case of shifting the phases of the rear edge end of the spiral blade 6 and the front edge end of the fan first-stage moving blade 2 in the peripheral direction, they may be arranged in such a manner that the rear edge of the spiral blade 6 and the front edge of the fan first-stage moving blade 2 overlap in the axial direction.

Further, in the second embodiment mentioned above, the intervals of the separated region S are approximately in parallel and are formed in a linearly extending shape, however, the present invention is not limited to this, the intervals of the separated region S may not be in parallel, and may be formed in a curved shape, a broken line or the like.

Figure 8:
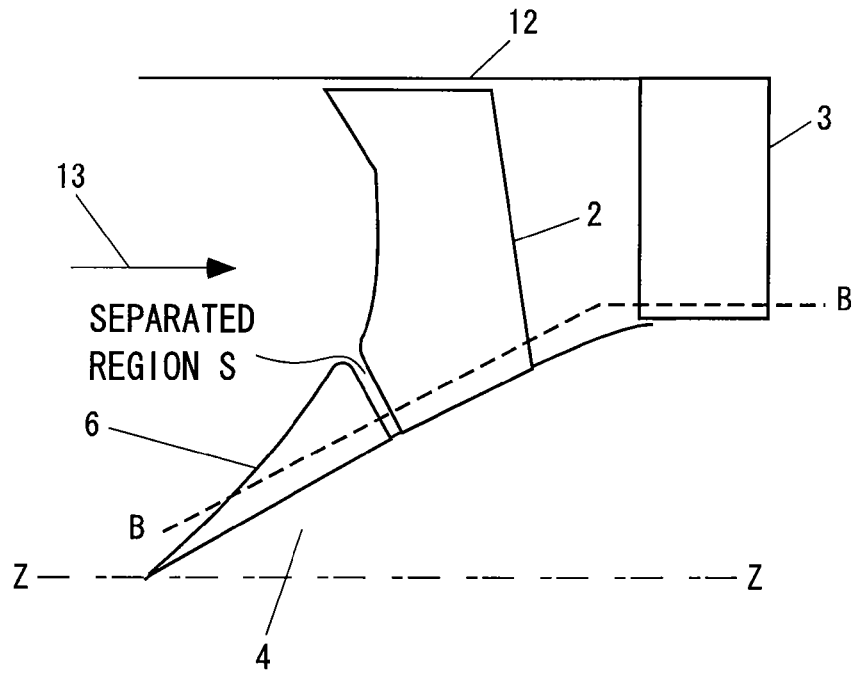
FIG. 8 is a partially structural drawing of a turbofan engine in accordance with a third embodiment of the present invention.
Figure 9:
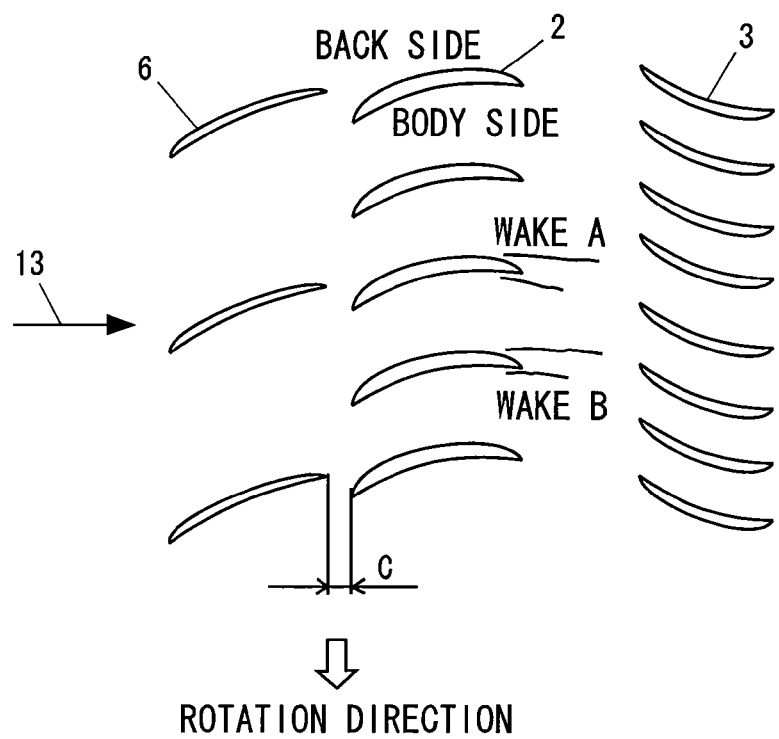
FIG. 9 is a cross sectional view along a line B-B in FIG. 8.

FIG. 8 is a partially structural drawing of a turbofan engine in accordance with a third embodiment of the present invention. In FIG. 8, reference numeral 3 denotes a stationary blade arranged in a downstream side of the fan first-stage moving blade 2. FIG. 9 is a cross sectional view along a line B-B in FIG. 8. As shown in FIG. 9, the spiral blade 6 is arranged in such a manner that a phase is shifted in a back side of the fan first-stage moving blade 2 in the peripheral direction. Further, the number of the spiral blades 6 is set to a half of the number of the fan first-stage moving blade 2. Further, the spiral blade 6 is arranged alternately one by one at a uniform interval with respect to the fan first-stage moving blade 2. The other portions have the same structure as the second embodiment.

In the normal blade row, a boundary layer tends to be developed in a back side, and the pressure loss is generated in the portion. However, in the third embodiment of the present invention, it is possible to expect an effect of blowing away the boundary layer in the back side of the fan first-stage moving blade 2 by arranging the spiral blade 6 in such a manner as to shift the phase to the back side of the fan first-stage moving blade 2 in the peripheral direction, whereby it is possible to reduce the pressure loss and it is possible to improve the engine performance. In this case, if the phase of the spiral blade 6 is shifted to the body side of the fan first-stage moving blade 2, the flow is disarranged, so that an adverse effect is generated.

Further, since the deformations in the peripheral direction and the axial direction are structurally generated in the fan first-stage moving blade 2 at a time of rotating, it is necessary to form the fan in such a manner as to prevent the spiral blade 6 and the fan first-stage moving blade 2 from being brought into contact with each other in the rotating region when the engine is operated. In the third embodiment of the present invention, since the spiral blade 6 is arranged in such a manner that the phase is shifted in the peripheral direction with respect to the fan first-stage moving blade 2, it is possible to prevent the spiral blade 6 and the fan first-stage moving blade 2 from being brought into contact with each other in the region when the engine is operated. The displacement of the phase in the peripheral direction is set such that the displacement exists in the body side in the entire region of the operation rotating speed of the engine.

Further, in the third embodiment of the present invention, a clearance c in an axial direction is provided between the spiral blade 6 and the fan first-stage moving blade 2, however, the rear edge of the spiral blade and the front edge of the fan first-stage moving blade 2 may be arranged so as to overlap in the axial direction, in place of the arrangement mentioned above. In this case, it is possible to effectively prevent the contact between the spiral blade 6 and the fan first-stage moving blade 2, by forming the clearance c in the axial direction as in the present embodiment.

An interference noise between the fan first-stage moving blade 2 and the stationary blade 3 arranged in the downstream side thereof is smaller in accordance with an increase of a ratio between the number of the stationary blade and the number of the moving blade (a wake number of the moving blade), and the number of the stationary blade 3 is normally equal to or more than two times of the number of the fan moving blade frequently. In the case that the spiral blade 6 is set to the same number as the fan first-stage moving blade 2, the wake generated in the fan first-stage moving blade 2 is of one kind, and the interference noise caused thereby has a certain frequency band. On the contrary, in the case that the spiral blade 6 is set to a half of the fan first-stage moving blade 2 as in the third embodiment in accordance with the present invention, two kinds of wakes such as a wake A and a wake B are generated as shown in FIG. 9, a frequency of the interference noise caused thereby is dispersed into two frequency bands, and a noise reduction effect can be expected. Further, since the number of the spiral blade 6 comes to a half, the total weight of the spiral blade 6 is reduced to a half, it is possible to achieve a weight saving of the engine and it is possible to reduce a cost.

Figure 10:
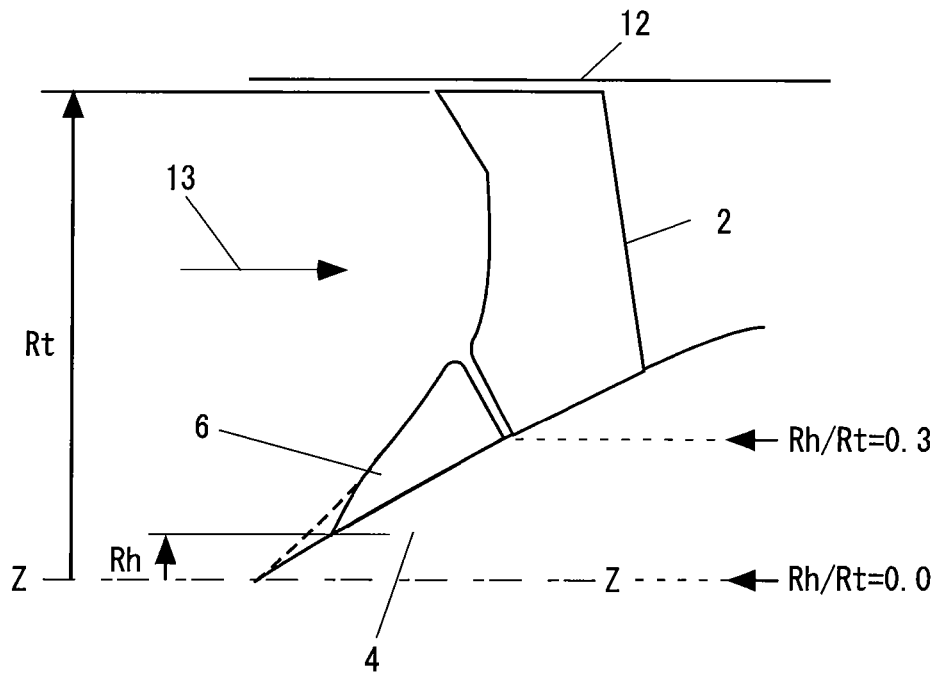
FIG. 10 is a partially structural drawing of a turbofan engine in accordance with a fourth embodiment of the present invention.

FIG. 10 is a partially structural drawing of a turbofan engine in accordance with a fourth embodiment of the present invention. As shown in this drawing, a leading end of the spiral blade 6 is positioned in a downstream side rather than a leading end of the spinner 4. The other portions have the same structures as those in any one of the first to third embodiment mentioned above. In this case, a boss ratio is defined as shown by an expression (1).

$$\text{Boss ratio} = Rh \text{(radius of spiral blade leading end)}/Rt \text{ (radius of fan inlet tip)} \tag{1}$$

In the case that the boss ratio=0, the leading end of the spiral blade 6 is positioned at the leading end of the spinner 4, as shown by a imaginary line in FIG. 10. Accordingly, a pitch between the adjacent blades becomes narrower in the leading end of the spiral blade 6. Therefore, an ice formation tends to be generated in the leading end of the spiral blade 6. Then, in accordance with the fourth embodiment of the present invention, the spiral blade 6 is formed in such a manner that the leading end of the spiral blade 6 is positioned in a downward side than the leading end of the spinner 4, such as the spiral blade 6 shown by a solid line in FIG. 10. In this embodiment, the rear edge hub side of the spiral blade 6 exists at a position corresponding to the boss ratio=0.3. In other words, the position of the leading end of the spiral blade is set such that the boss ratio (Rh/Rt) comes to a range of 0<Rh/Rt<0.4. Accordingly, since a diameter of an outer periphery of the spinner 4 is gradually increased toward the downstream side, the pitch between the blades in the leading end of the spiral blade 6 is widened by positioning the leading end of the spiral blade 6 in the downward side rather than the leading end of the spinner 4.

In accordance with the fourth embodiment of the present invention, since the spiral blade 6 is formed as mentioned above, the pitch between the blades in the leading end of the spiral blade 6 is widened. Accordingly, the ice formation is hard to be generated. Further, since the spiral blade 6 itself is made compact and the weight is reduced, it is possible to achieve the weight saving of the engine.

Figure 11:
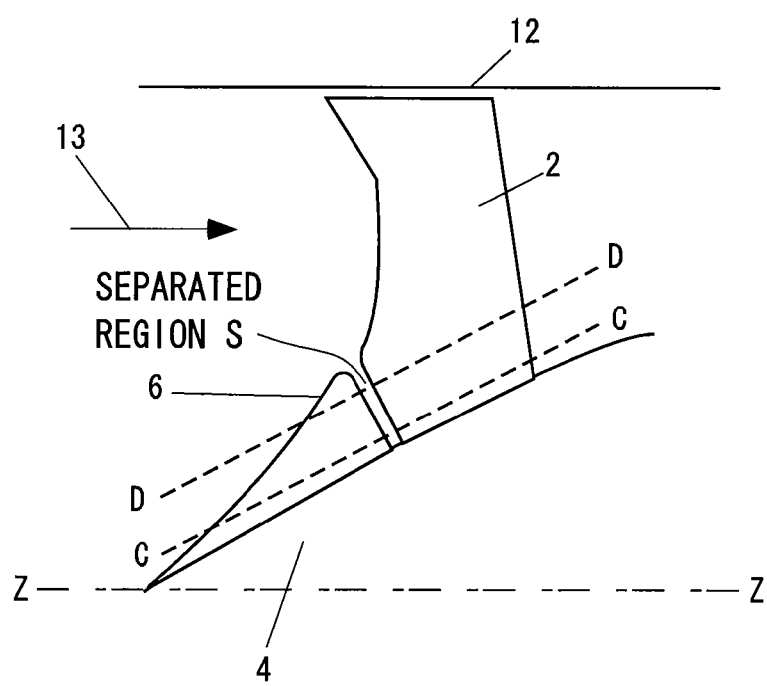
FIG. 11 is a partially structural drawing of a turbofan engine in accordance with a fifth embodiment of the present invention.

FIG. 11 is a partially schematic view of a turbofan engine in accordance with a fifth embodiment of the present invention. In the present embodiment, the spiral blade 6 is separated from the fan first-stage moving blade 2, and the separated region S is formed therebetween. Further, the same number of the spiral blades 6 as that of the fan first-stage moving blades 2 are arranged in the upstream side of the fan first-stage moving blade 2. In this case, in the same manner as the third embodiment mentioned above, the number of the spiral blade 6 may be set to a half of the fan first-stage moving blade 2. Further, in the fifth embodiment in accordance with the present invention, it is preferable that the features of the second to fourth embodiments mentioned above are provided.

Figure 12A:
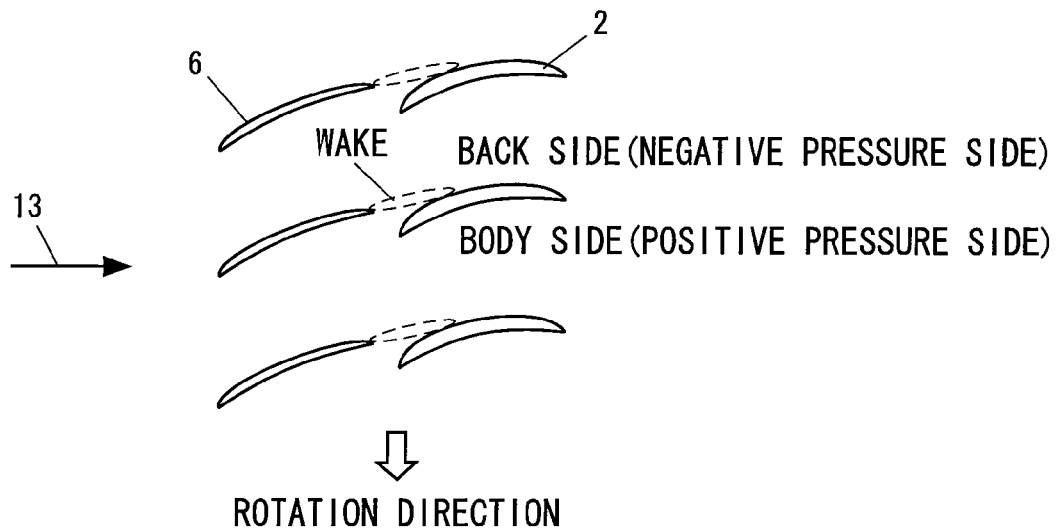
FIG. 12A is a cross sectional view along a line C-C in FIG. 11.
Figure 12B:
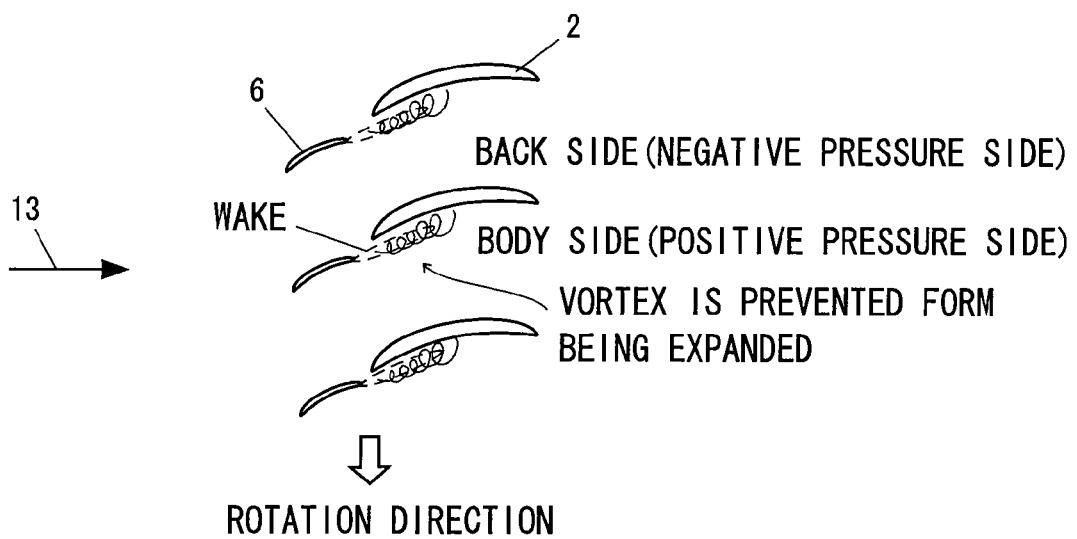
FIG. 12B is a cross sectional view along a line D-D in FIG. 11.

FIG. 12A is a cross sectional view along a line C-C in FIG. 11. FIG. 12B is a cross sectional view along a line D-D in FIG. 11. As shown in FIGS. 12A and 12B, the shapes and the arrangements of the spiral blade 6 and the fan first-stage moving blade 6 are set such that the hub side wake of the spiral blade 6 is brought into contact with the back side of the fan first-stage moving blade 2 (a negative pressure surface), and the tip side wake of the spiral blade 6 is brought into contact with the body side of the fan first-stage moving blade 2 (a positive pressure surface).

Figure 13A:
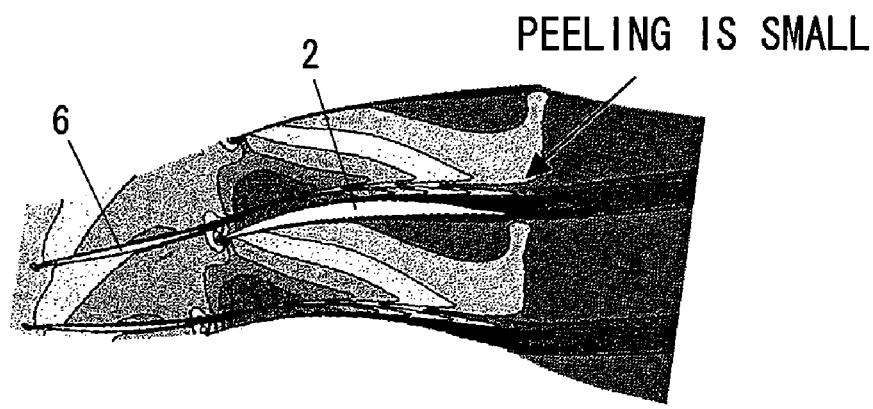
FIG. 13A is Mach number contour view showing results of CFD analysis.
Figure 13B:
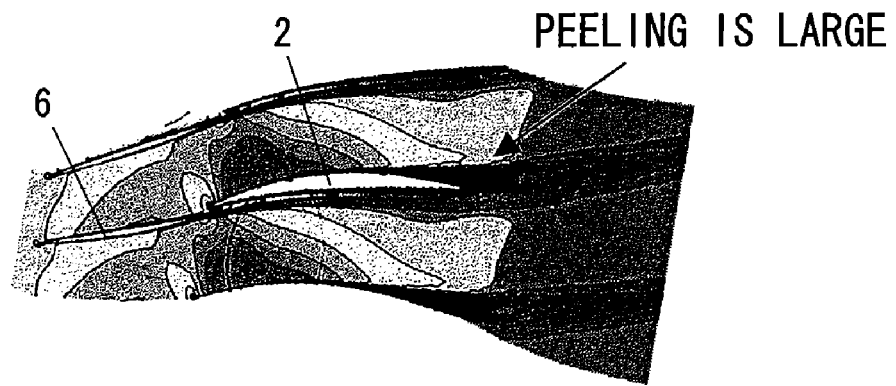
FIG. 13B is Mach number contour view showing results of CFD analysis.
Figure 14:
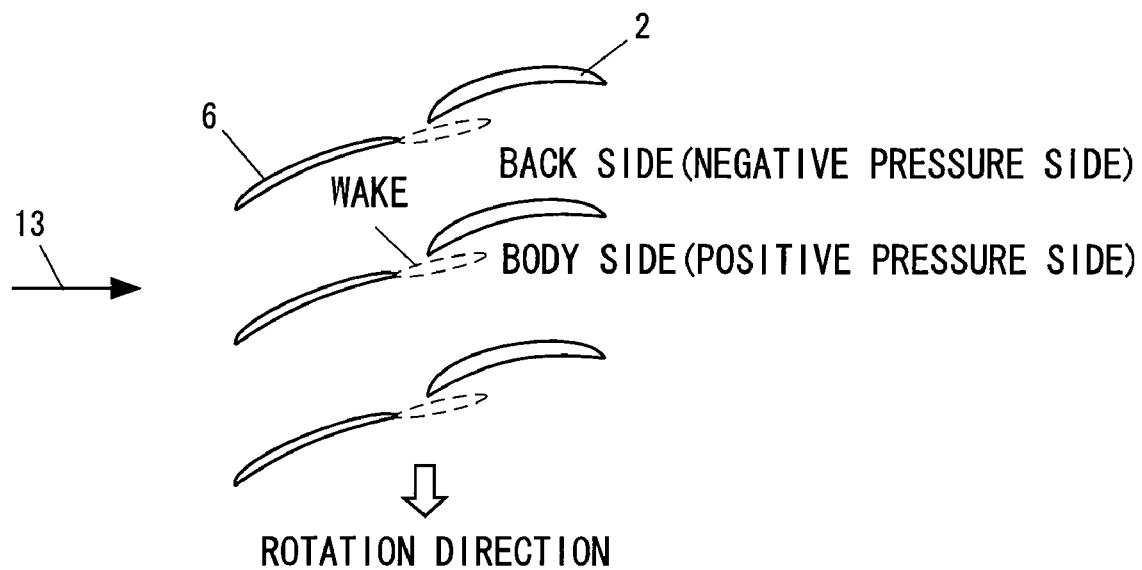
FIG. 14 is a view in the case of setting such that a wake in a hub side of a spiral blade is brought into contact with a body side of a fan first-stage moving blade.

FIG. 13A is a Mach number contour view showing a result of CFD analysis in the case of setting such that the hub side wake of the spiral blade 6 is brought into contact with the back side of the fan first-stage moving blade 2. FIG. 13B is a Mach number contour view showing a result of CFD analysis in the case of setting such that the hub side wake of the spiral blade 6 is brought into contact with the body side of the fan first-stage moving blade 2 as shown in FIG. 14, which is inverse to the present invention. As seen from FIG. 13B, in the case of setting such that the hub side wake of the spiral blade 6 is brought into contact with the body side of the fan first-stage moving blade 2, it is known that the peeling of the flow is enlarged in the rear edge of the fan first-stage moving blade. On the other hand, as seen from FIG. 13A, in the case of setting such that the hub side wake of the spiral blade 6 is brought into contact with the back side of the fan first-stage moving blade 2 as in the present invention, the development of the boundary layer in the back side of the fan first-stage moving blade 2 is suppressed by the hub side wake of the spiral blade 6, so that it is known that the peeling of the flow can be made smaller in the rear edge of the fan first-stage moving blade.

Figure 15A:
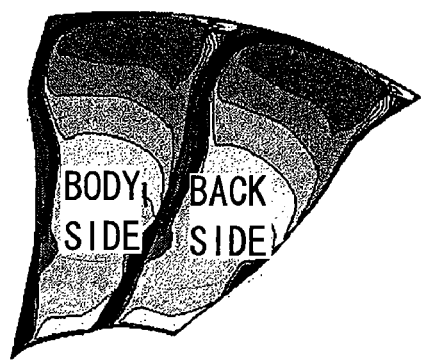
FIG. 15A is Mach number contour view showing results of CFD analysis.
Figure 15B:
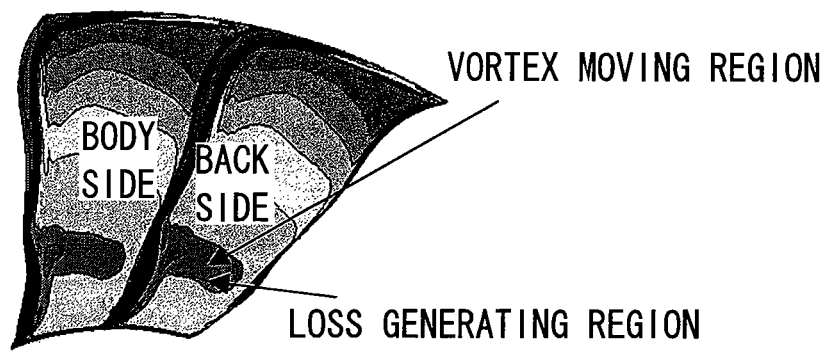
FIG. 15B is Mach number contour view showing results of CFD analysis.

FIG. 15A is a Mach number contour view showing a result of CFD analysis at a time of viewing a cross section perpendicular to the center line Z of the engine at the rear side position of the fan first-stage moving blade 2 from the rear side of the engine, in the case of setting such that the tip side wake of the spiral blade 6 is brought into contact with the body side of the fan first-stage moving blade 2 (the case in FIG. 12B). FIG. 15B is a Mach number contour view showing a result of CFD analysis at a time of viewing the cross section perpendicular to the center line Z of the engine at the rear side position of the fan first-stage moving blade 2 from the rear side of the engine, in the case of setting such that the tip side wake of the spiral blade 6 is brought into contact with the back side of the fan first-stage moving blade 2, as is inverse to the present invention.

Figure 16:
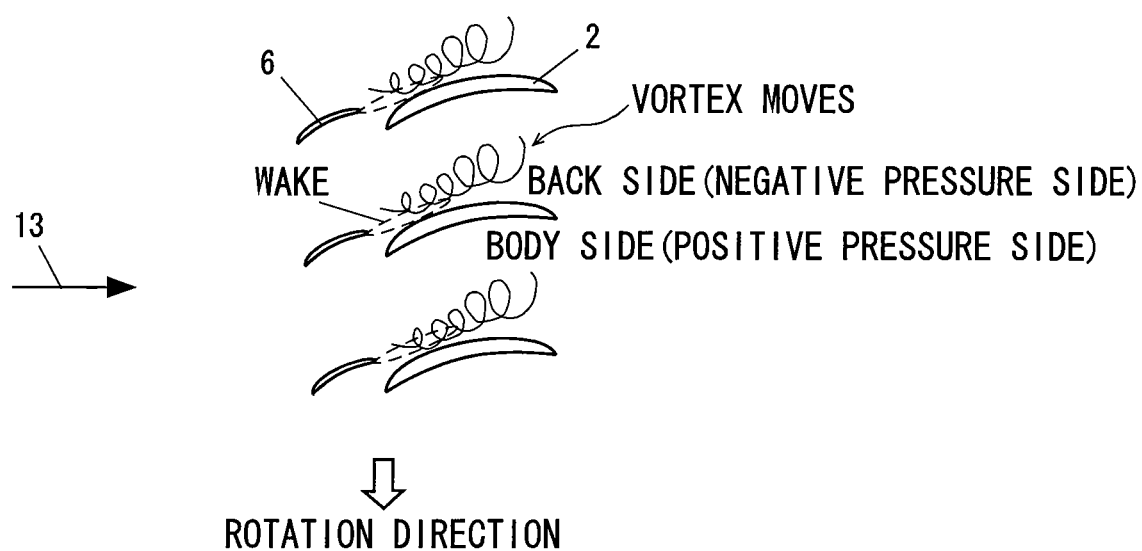
FIG. 16 is a view in the case of setting such that a wake in a tip side of the spiral blade is brought into contact with a back side of the fan first-stage moving blade.

As seen from FIG. 16, in the case of setting such that the tip side wake of the spiral blade 6 is brought into contact with the back side of the fan first-stage moving blade 2, the vortex generated approximately in the same direction as that of the tip side wake of the spiral blade 6 is moved and enlarged. As a result, as shown in FIG. 15B, a loss generating region is generated. On the contrary, in the case of setting such that the tip side wake of the spiral blade 6 is brought into contact with the body side of the fan first-stage moving blade 2 as in FIG. 12B, the vortex generated in the tip side of eth spiral blade 6 is prevented from being expanded on the basis of the fan first-stage moving blade 2 forming a blocking layer. Accordingly, it is known that the loss generating region as shown in FIG. 15B is not generated in FIG. 15A.

In accordance with the fifth embodiment of the present invention, since it is possible to widely reduce the pressure loss caused by the peeling and the enlargement of the vortex as mentioned above, it is possible to contribute to the high efficiency of the engine.

As mentioned above, the turbofan engine in accordance with the present invention can increase the intake air flow rate of the fan first-stage moving blade without enlarging the diameter of the fan and the inner diameter of the casing, whereby there can be obtained excellent effects that it is possible to increase the bypass ratio, it is possible to reduce the engine weight as well as achieving the favorable mileage and the low noise, and the like.

In this case, the turbofan engine in accordance with the present invention is described on the basis of several preferable embodiments, however, it is understood that the scope of the present invention is not limited to these embodiments. On the contrary, the scope of the present invention includes all the modifications, corrections and equivalents contained in the appended claims.

The invention claimed is:

1. A turbofan engine comprising:
   (a) a core flow duct located at a center of the engine;
   (b) a bypass flow duct located at an outer periphery of the engine;
   (c) a fan first-stage moving blade for taking an air therein; and
   (d) a spinner rotationally driving the fan first-stage moving blade,
   wherein the spinner has a spiral blade extending spirally to an outer side in a radial direction from an axis of the spinner, sucking air from a front face of the spinner and supplying air to the fan first-stage moving blade, wherein the spiral blade and the fan first-stage moving blade are separated, wherein a separated region is formed between a rear edge end of the spiral blade and a front edge end of the fan first-stage moving blade, wherein the separated region extends toward the outer side in a radial direction from the axis of the spinner, in a direction inclined to a front side of the engine with respect to a plane perpendicular to a center line of the engine, and wherein a meridian plane shape at a position in a radially outer side rather than a root of the separated region in the spiral blade corresponds to a shape in which a chord length of the spiral blade is reduced toward a tip side of the spiral blade from a hub side of the spiral blade, and the chord length comes to zero without limit in the tip side of the spiral blade, wherein a tip is formed at a position of the rear edge end of the spiral blade, brought into contact with a diametrically outer end of the separated region, wherein a portion protruding toward the spiral blade side is formed at a position of the front edge end of the fan first-stage moving blade, brought into contact with the diametrical outer end of the separated region, and wherein the tip of the spiral blade and the protruding portion of the fan first-stage moving blade are formed in a curved shape.

2. A turbofan engine comprising:
(a) a core flow duct located at a center of the engine;
(b) a bypass flow duct located at an outer periphery of the engine;
(c) a fan first-stage moving blade for taking an air therein; and
(d) a spinner rotationally driving the fan first-stage moving blade, wherein the spinner has a spiral blade extending spirally to an outer side in a radial direction from an axis of the spinner, sucking air from a front face of the spinner and supplying air to the fan first-stage moving blade, wherein the spiral blade and the fan first-stage moving blade are separated, wherein a separated region is formed between a rear edge end of the spiral blade and a front edge end of the fan first-stage moving blade, wherein the separated region extends in a direction of 90 degrees, or, 90 degrees plus or minus about 10 degrees with respect to a hub side passage surface, and wherein a meridian plane shape at a position in a radially outer side rather than a root of the separated region in the spiral blade corresponds to a shape in which a chord length of the spiral blade is reduced toward a tip side of the spiral blade from a hub side of the spiral blade, and the chord length comes to zero without limit in the tip side of the spiral blade, wherein a tip is formed at a position of the rear edge end of the spiral blade, brought into contact with a diametrically outer end of the separated region, wherein a portion protruding toward the spiral blade side is formed at a position of the front edge end of the fan first-stage moving blade, brought into contact with the diametrical outer end of the separated region, and wherein the tip of the spiral blade and the protruding portion of the fan first-stage moving blade are formed in a curved shape.

3. A turbofan engine comprising:
(a) a core flow duct located at a center of the engine;
(b) a bypass flow duct located at an outer periphery of the engine;
(c) a fan first-stage moving blade for taking an air therein; and
(d) a spinner rotationally driving the fan first-stage moving blade, wherein the spinner has a spiral blade extending spirally to an outer side in a radial direction from an axis of the spinner, sucking air from a front face of the spinner and supplying air to the fan first-stage moving blade, wherein the spiral blade and the fan first-stage moving blade are separated, wherein a separated region is formed between a rear edge end of the spiral blade and a front edge end of the fan first-stage moving blade, wherein the separated region extends in a direction inclined to a front side of the engine at an angle of other than 90 degrees with respect to a hub side passage surface, and wherein a meridian plane shape at a position in a radially outer side rather than a root of the separated region in the spiral blade corresponds to a shape in which a chord length of the spiral blade is reduced toward a tip side of the spiral blade from a hub side of the spiral blade, and the chord length comes to zero without limit in the tip side of the spiral blade, wherein a tip is formed at a position of the rear edge end of the spiral blade, brought into contact with a diametrically outer end of the separated region, wherein a portion protruding toward the spiral blade side is formed at a position of the front edge end of the fan first-stage moving blade, brought into contact with the diametrical outer end of the separated region, and wherein the tip of the spiral blade and the protruding portion of the fan first-stage moving blade are formed in a curved shape.

* * * * *